…

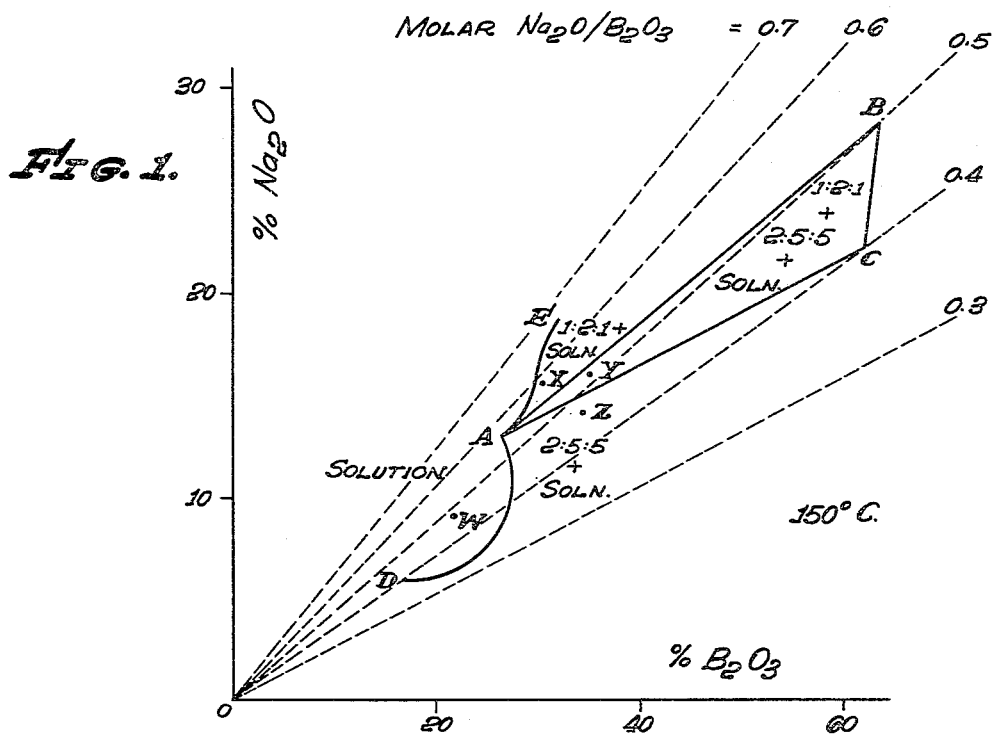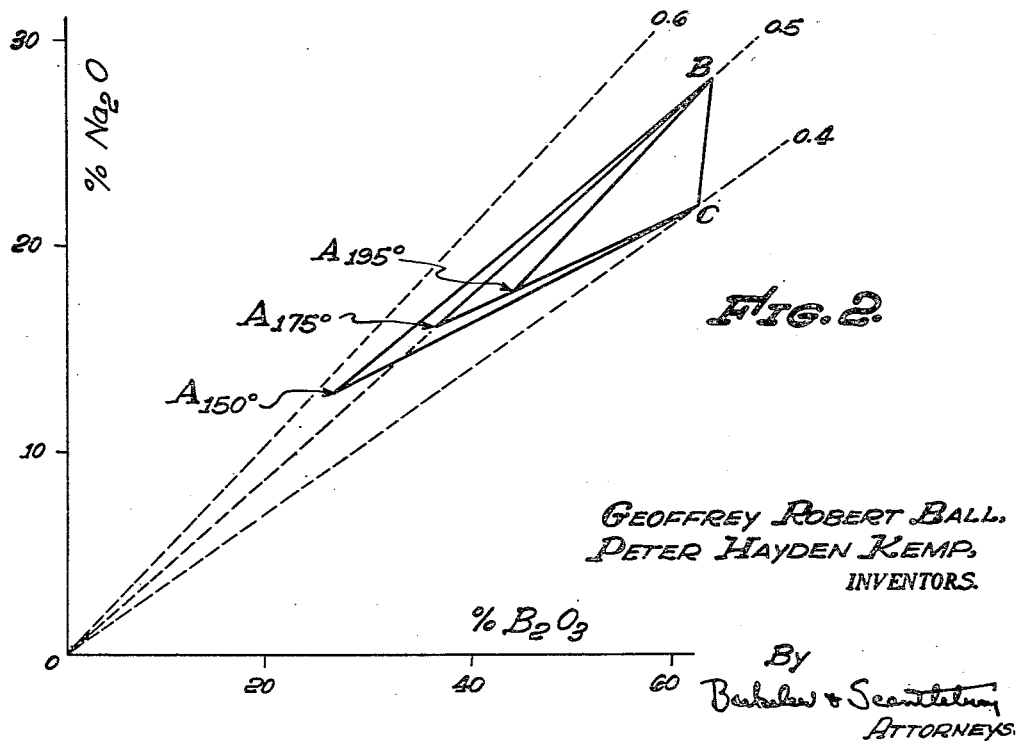

United States Patent Office 2,773,738
Patented Dec. 11, 1956

2,773,738
NEW CRYSTALLINE SODIUM BORATE AND METHOD FOR PRODUCING THE SAME

Geoffrey R. Ball, Belvedere, and Peter H. Kemp, London, England, assignors, by mesne assignments, to United States Borax & Chemical Corporation Application August 24, 1953, Serial No. 376,198

Claims priority, application Great Britain August 27, 1952

8 Claims. (Cl. 23—59)

This invention relates to a new crystalline sodium tetraborate having one molecule of water of hydration, and two methods for producing the same.

Ordinary borax is sodium tetraborate decahydrate, $Na_2B_4O_7 \cdot 10H_2O$, and contains water to the extent of nearly half its weight. In order to reduce the cost of transportation, and for other reasons, it is desirable to remove some or all of the water from borax, as by dehydration. However, available methods for doing that are either less effective than may be desired or are commercially inconvenient because of the high temperatures required and the tendency to intumescence. The present invention provides, among other advantages, a new crystalline compound having a composition similar to that of borax but containing only one tenth as much water of hydration calculated on a molar basis. Moreover, the new compound can be crystallized directly from solution.

By heating borax solutions under pressure, Auger (Compt. rend. (1925), 180, 1602) obtained the compound $2Na_2O \cdot 5B_2O_3 \cdot 5H_2O$, hereinafter referred to as Augers sodium borate; and mixtures of this compound with varying proportions of partially dehydrated borax appear to be the main results of the few experiments since described by other workers.

We have now found that by careful attention to temperature, molar ratio $Na_2O/B_2O_3$, and proportion of water present, the new compound sodium tetraborate monohydrate may be obtained in crystalline form by heating sodium borate mixtures in a pressure vessel. Such controlled heating may be continued until equilibrium is attained or until a sufficient quantity of monohydrate crystals have been deposited from solution.

According to one aspect thereof, the present invention provides a process for the production of sodium tetraborate monohydrate which comprises heating a starting material comprising any sodium borate or mixture of sodium borates, having a molar ratio $Na_2O/B_2O_3$ between about 0.4 and about 0.7 and a water content as hereinafter defined, in a pressure vessel to a working temperature which is dependent on the molar ratio and water content in a manner to be described until equilibrium is attained or until a sufficient quantity of monohydrate crystals have been deposited from solution, and filtering and washing the product to obtain the said monohydrate.

The starting material may comprise primarily sodium tetraborate, for example ordinary borax or the pentahydrate $Na_2B_4O_7 \cdot 5H_2O$ or calcined borax having a desired water content; and the molar ratio may be adjusted, if necessary, to the desired value, for example by the addition of sodium metaborate or caustic soda to obtain a value higher than 0.5, and by the addition of sodium pentaborate or boric acid to obtain a value less than 0.5. A preferred starting material comprises a mixture of sodium tetraborate pentahydrate and either caustic soda or crystalline sodium metaborate ($NaBO_2 \cdot 4H_2O$) with or without added water.

The monohydrate is not formed at temperatures below about 115° C. but any convenient higher temperature may be employed. As the working temperature is increased, equilibrium is more rapidly reached, but at higher temperatures, for example above about 195° C., the working pressure may be inconveniently high.

The term "water content" is used in the present specification and claims to mean the total amount of water, whether present in the original starting materials or added thereto or both. This water is preferably, although not necessarily, sufficient to dissolve the solid starting material present to a clear solution at the temperature chosen. In practice, crystallization of monohydrate from the solution usually begins during the heating process, and a clear solution is therefore not necessarily obtained; but if the selected temperature is reached rapidly, as for example when small test amounts are used, a clear solution can be obtained.

A full understanding of the invention and of its further objects and advantages will be had from the following description of certain illustrative manners of carrying it out. However, the particulars of that description, and of the accompanying drawings which form a part of it, are not intended as a limitation upon the scope of the invention, which is set out in the appended claims.

In the drawings:

Fig. 1 is an isothermal diagram illustrating phase relationships in the system $Na_2O$—$B_2O_3$—$H_2O$ for 150° C.

Fig. 2 is a diagram corresponding in part to Fig. 1 and illustrating the variation of certain quantities with temperature.

In the figures the vertical and horizontal axes represent the respective proportions of sodium oxide ($Na_2O$) and boric oxide ($B_2O_3$) contained in the system, expressed as percentages by weight, so that any one point on the diagram denotes one particular mixture or composition of $Na_2O$, $B_2O_3$ and $H_2O$, the proportion of the latter being the deficiency from 100 remaining after summing those of the two oxides. The broken lines connect the points corresponding to mixtures or compounds having the same value of the molar ratio $Na_2O/B_2O_3$, the value for each line being indicated. Thus the point B has the composition of pure sodium tetraborate monohydrate (28.27% $Na_2O$, 63.51% $B_2O_3$, 8.22% $H_2O$), and the point C has the composition of pure Augers sodium borate (22.05% $Na_2O$, 61.94% $B_2O_3$, 16.02% $H_2O$). In Fig. 1, the curves AE and AD are the solubility curves for 150° C. of the monohydrate and of Augers borate, respectively, which intersect at the ternary point A.

Any mixture of sodium borate and water within the range indicated, on heating to 150° C., will either form a homogeneous solution or will deposit crystals of the monohydrate or of Augers sodium borate or of both, according to the field in the phase diagram in which the point representing the initial composition of the mixture falls. The nature of the solid phase or phases that separate is indicated on the diagram, 1:2:1 denoting the monohydrate and 2:5:5 the Augers borate. Thus the mixture whose composition is represented by the point W will give a clear solution; that represented by X will deposit crystals of the monohydrate; that represented by Y will deposit crystals both of the monohydrate and of Augers borate; and that represented by Z will deposit crystals of Augers borate only.

The points B and C, denoting pure compounds, remain unchanged in position as the temperature is varied; however, the solubility curves and the ternary point A in which they intersect change their positions somewhat with temperature.

The position of the ternary point A at any temperature may be defined by the molar ratio $Na_2O/B_2O_3$ and the water content corresponding to it. The values of those two quantities for three particular illustrative temperatures are as folows:

| Temperature | Na$_2$O/B$_2$O$_3$ | Water, percent |
|---|---|---|
| 150° C | 0.56 | 61 |
| 175° C | 0.502 | 49 |
| 195° C | 0.46 | 38 |

In Fig. 2 the position of the ternary point at each of those temperatures is shown, as well as the corresponding position and shape assumed by the field "1:2:1+2:5:5+ solution." It will be seen that the side AB of that field alters its inclination to the 0.5 ratio line as the temperature changes; and lies exactly on that line when the temperature is approximately 177° C.

For a successful preparation of the monohydrate, the composition of the mixture must be such as to be represented by a point lying within the field "1:2:1+ solution" at the operating temperature. To achieve this, both the molar ratio Na$_2$O/B$_2$O$_3$ and the water content must be suitably adjusted. With a suitable choice of temperature and water content, any ratio from about 0.4 to about 0.7 may be employed. At temperatures above 130° C., however, the use of too high a molar ratio leads to a viscous liquor which does not crystallize readily. At temperatures below about 177° C. a molar ratio below 0.5 cannot be used effectively, since a mixture of the monohydrate and Augers borate is then deposited. Between 115 and 177° C. and at sufficiently low water content the molar ratio may be somewhat lower than that corresponding to the ternary point A at the temperature concerned. But if the water content is taken too low a viscous mixture is obtained which crystallizes only slowly and from which the resulting crystals are difficult to separate.

It has been found preferable for operation at working temperatures between 115° C. and 150° to use a starting mixture having a molar ratio from 0.5 to 0.7, the range from 0.6 to 0.7 being particularly suitable at temperatures from 115° C. to about 130° C. At temperatures above 150° C. the molar ratio is preferably between 0.4 and 0.6, and may be made progressively closer to 0.4 as the working temperature increases.

After filtration to separate the monohydrate crystals from the main body of the solution, effective washing of the crystal mass obtained depends to an important degree on the crystal size. The most efficient conditions are those which give a proper balance between yield of monohydrate and as large as possible crystal size. It has been found that a molar ratio of 0.52, a total water content of 35% by weight of the starting materials and a working temperature of 170° C. give a particularly satisfactory yield with reasonable crystal size.

It is to be understood, however, that the invention is not limited to these conditions, but includes molar ratios as high as 0.7 and as low as 0.4, the temperature and water content being adjusted correspondingly as described herein. It has been found that with molar ratios above about 0.7 crystallization at all temperatures is too slow for the process to be commercially advantageous.

The folowing specific examples represent illustrative preferred methods for the production of sodium tetraborate monohydrate in accordance with the invention.

EXAMPLE I

An autoclave of 10 liters capacity, fitted with stirring gear and discharge pipe of conventional type, was charged with:

Na$_2$B$_4$O$_7$·5H$_2$O _____ kilograms__ 5
NaBO$_2$·4H$_2$O _____ do____ 2.5

The mixture gives a gross composition of 21.68% Na$_2$O, 40.29% B$_2$O$_3$, 38.03% H$_2$O, with molar ratio Na$_2$O/B$_2$O$_3$ of 0.60.

The vessel was heated to 150° C. and maintained at this temperature for 4 hours.

The resulting slurry of monohydrate crystals was then discharged under pressure through a filter press. After filtration, compressed air was passed through the press to remove mother liquor as completely as possible.

The filter cake, consisting of monohydrate crystals with adherent mother liquor, was broken up and stirred with 12 liters cold water for a few minutes to dissolve off the adhering mother liquor, and the monohydrate crystals were then separated by centrifuging. The product was washed in the centrifuge by spraying with cold water, and the washings were removed as completely as possible. The crystals were then rapidly dried in a current of hot air.

The yield of sodium tetraborate monohydrate was 1.8 kilograms.

EXAMPLE II

The procedure was as described in Example I, except that caustic soda was used in place of the metaborate to adjust the molar ratio Na$_2$O/B$_2$O$_3$. The autoclave charge was:

Na$_2$B$_4$O$_7$·5H$_2$O _____ kilograms__ 7
NaOH _____ do____ 0.154
Water _____ liters__ 0.233 giving a composition of 18.82% Na$_2$O, 39.15% B$_2$O$_3$, 42.08% H$_2$O, with molar ratio Na$_2$O/B$_2$O$_3$ of 0.54. The working temperature was 150° C.

The yield of monohydrate was 2.0 kilograms.

EXAMPLE III

The procedure was as described in Example I, except that the working temperature was higher so that a charge of molar ratio Na$_2$O/B$_2$O$_3$ of 0.50 could be used. The autoclave charge consisted of:

Na$_2$B$_4$O$_7$·5H$_2$O _____ kilograms__ 4.5 corresponding to a composition of 21.28% Na$_2$O, 47.81% B$_2$O$_3$, 30.91% H$_2$O, with molar ratio 0.50. The working temperature was 177° C.

The yield of monohydrate was 2.5 kilograms.

From one sample of the monohydrate prepared according to the invention, the following X-ray diffraction data were obtained:

*Principal lines*

| d-Value in Angstrom Units | Approximate Relative Intensity |
|---|---|
| 7.3 | .08 |
| 4.87 | 1.00 |
| 4.22 | .45 |
| 3.96 | .25 |
| 3.78 | .10 |
| 3.49 | .15 |
| 3.27 | .15 |
| 3.09 | .35 |
| 2.98 | .50 |
| 2.82 | .35 |
| 2.69 | .80 |
| 2.53 | .15 |
| 2.43 | .20 |
| 2.36 | .30 |
| 2.27 | .15 |
| 2.19 | .20 |
| 2.13 | .10 |
| 1.97 | .15 |
| 1.93 | .30 |
| 1.85 | .30 |
| 1.75 | .10 |
| 1.71 | .15 |
| 1.64 | .10 |
| 1.60 | .10 |

We claim:
1. Crystalline sodium tetraborate monohydrate, Na$_2$B$_4$O$_7$·H$_2$O.
2. The process for producing crystalline sodium tetraborate monohydrate, which comprises producing an aqueous sodium borate solution having a molar ratio Na$_2$O/B$_2$O$_3$ between 0.4 and 0.7 and having a predeter- mined water content, and maintaining the solution at a temperature above about 115° C. to deposit from the solution crystals of sodium tetraborate monohydrate, the said water content of the solution being insufficient to maintain all the borate in solution at the said temperature, and the said molar ratio having a value that is within the said range and is sufficiently high to prevent precipitation of $2Na_2O \cdot 5B_2O_3 \cdot 5O_2$ at the said temperature and water content.

3. The process for producing crystalline sodium tetraborate monohydrate, which comprises heating a starting material comprising sodium tetraborate and a substance selected from the group consisting of caustic soda, sodium metaborate and boric acid to produce an aqueous solution having a molar ratio $Na_2O/B_3O_2$ between 0.4 and 0.7 and having a predetermined water content, and maintaining the solution at a temperature above about 115° C. to deposit from the solution crystals of sodium tetraborate monohydrate, the said water content of the solution being insufficient to maintain all the borate in solution at the said temperature, and the said molar ratio having a value that is within the said range and is sufficiently high to prevent precipitation of $$2Na_2O \cdot 5B_2O_3 \cdot 5H_2O$$

at the said temperature and water content.

4. The process for producing crystalline sodium tetraborate monohydrate, which comprises heating a starting material comprising sodium metaborate and a substance selected from the group consisting of sodium tetraborate decahydrate and sodium tetraborate pentahydrate to produce an aqueous solution having a molar ratio $$Na_2O/B_2O_3$$

between 0.5 and 0.7 and having a predetermined water content, and maintaining the solution at a temperature above about 115° C. to deposit from the solution crystals of sodium tetraborate monohydrate, the said water content of the solution being insufficient to maintain all the borate in solution at the said temperature, and the said molar ratio having a value that is within the said range and is sufficiently high to prevent precipitation of $$2Na_2O \cdot 5B_2O_3 \cdot 5H_2O$$

at the said temperature and water content.

5. The process for producing crystalline sodium tetraborate monohydrate, which comprises producing an aqueous solution of sodium borate having a molar ratio $Na_2O/B_2O_3$ between about 0.5 and 0.7 and having a predetermined water content, and maintaining the solution at a temperature between 115° C. and about 150° C., the said water content of the solution being insufficient to maintain all the borate in solution at the said temperature, and the said molar ratio having a value that is within the said range and is sufficiently high to prevent precipitation of $2Na_2O \cdot 5B_2O_3 \cdot 5H_2O$ at the said temperature and water content.

6. The process for producing crystalline sodium tetraborate monohydrate, which comprises producing an aqueous solution of sodium borate having a molar ratio $Na_2O/B_2O_3$ between about 0.6 and 0.7 and having a predetermined water content, and maintaining the solution at a temperature between 115° C. and about 130° C., the said water content of the solution being insufficient to maintain all the borate in solution at the said temperature, and the said molar ratio having a value that is within the said range and is sufficiently high to prevent precipitation of $2Na_2O \cdot 5B_2O_3 \cdot 5H_2O$ at the said temperature and water content.

7. The process for producing crystalline sodium tetraborate monohydrate, which comprises producing an aqueous solution of sodium borate having a molar ratio $Na_2O/B_2O_3$ between about 0.4 and 0.6 and having a predetermined water content, and maintaining the solution at a temperature between about 150° C. and about 195° C., the said water content of the solution being insufficient to maintain all the borate in solution at the said temperature, and the said molar ratio having a value that is within the said range and is sufficiently high to prevent precipitation of $2Na_2O \cdot 5B_2O_3 \cdot 5H_2O$ at the said temperature and water content.

8. The process for producing crystalline sodium tetraborate monohydrate, which comprises producing an aqueous solution of sodium borate having a molar ratio $Na_2O/B_2O_3$ of approximately 0.52 and having a total water content of approximately 35% by weight, and maintaining the said solution at a temperature of approximately 170° C. to deposit from the solution crystals of sodium tetraborate monohydrate.

References Cited in the file of this patent

UNITED STATES PATENTS 2,032,388    Allen _____ Mar. 3, 1936

OTHER REFERENCES

Atterberg: "Zeitschrift fur Anorganische Chemie," vol. 48, pages 367–373 (1906).